United States Patent
Meissner

(10) Patent No.: US 10,059,298 B2
(45) Date of Patent: Aug. 28, 2018

(54) HEAD AIRBAG SYSTEM FOR A VEHICLE AND VEHICLE WITH A HEAD AIRBAG SYSTEM

(71) Applicant: AUTOMOTIVE SAFETY TECHNOLOGIES GMBH, Gaimersheim (DE)

(72) Inventor: Norman Meissner, Ingolstadt (DE)

(73) Assignee: AUTOMOTIVE SAFETY TECHNOLOGIES GMBH, Gaimersheim (DE)

( * ) Notice: Subject to any disclaimer, the term of this patent is extended or adjusted under 35 U.S.C. 154(b) by 0 days.

(21) Appl. No.: 15/308,242

(22) PCT Filed: May 7, 2015

(86) PCT No.: PCT/EP2015/060055
§ 371 (c)(1),
(2) Date: Nov. 1, 2016

(87) PCT Pub. No.: WO2015/169896
PCT Pub. Date: Nov. 12, 2015

(65) Prior Publication Data
US 2017/0050608 A1    Feb. 23, 2017

(30) Foreign Application Priority Data

May 8, 2014    (EP) .................................. 14167500

(51) Int. Cl.
*B60R 21/231*    (2011.01)
*B60R 21/232*    (2011.01)
(Continued)

(52) U.S. Cl.
CPC .......... *B60R 21/231* (2013.01); *B60R 21/213* (2013.01); *B60R 21/232* (2013.01);
(Continued)

(58) Field of Classification Search
CPC ............... B60R 21/231; B60R 21/213; B60R 21/23138; B60R 21/232; B60R 21/233;
(Continued)

(56) References Cited

U.S. PATENT DOCUMENTS 5,730,464 A *   3/1998   Hill ................... B60R 21/23138
                                                      280/730.2
8,596,673 B2 * 12/2013   Ruedisueli .............. B60R 21/21
                                                      280/730.2
(Continued)

FOREIGN PATENT DOCUMENTS

DE    10 2007 025 986 A1    12/2008
EP         1 577 172 A2      9/2005
WO           97/06987 A1     2/1997

OTHER PUBLICATIONS

International Search Report of PCT/EP2015/060055, dated Sep. 9, 2015. [PCT/ISA/210].

*Primary Examiner* — Drew J Brown
(74) *Attorney, Agent, or Firm* — Sughrue Mion, PLLC

(57) ABSTRACT

The invention relates to a head airbag system for a vehicle, with a gas bag (10) unfoldable from a stowed position to a restraining position, said gas bag having two facing end sections (12, 14) connected to each other by means of a connecting element (16) fastened to said end sections, wherein the end sections (12, 14) are arranged opposite each other with respect to a main deployment direction (Z) of the gas bag (10); the connecting element (16) is formed and fastened to the end sections (12, 14) in such a way that in an unfolded restraining position of the gas bag (10) the distance between the end sections (12, 14) with respect to the vertical direction (Z) of the unfolded gas bag (10) is less than the length of a gas bag section running between the end sections. The invention further relates to a vehicle with a head airbag system.

13 Claims, 3 Drawing Sheets

Figure 1:
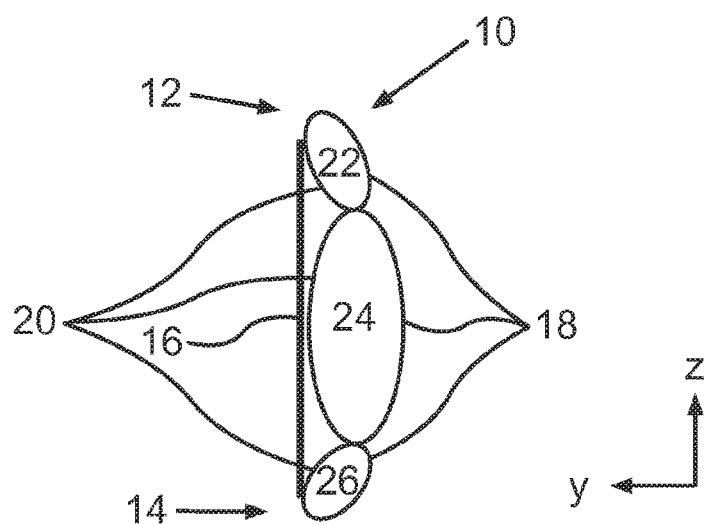

(51) Int. Cl.
*B60R 21/2338* (2011.01)
*B60R 21/213* (2011.01)
*B60R 21/233* (2006.01)
*B60R 21/235* (2006.01)
*B60R 21/00* (2006.01)

(52) U.S. Cl.
CPC .......... *B60R 21/233* (2013.01); *B60R 21/235* (2013.01); *B60R 21/2338* (2013.01); *B60R 21/23138* (2013.01); *B60R 2021/0009* (2013.01); *B60R 2021/23308* (2013.01); *B60R 2021/23386* (2013.01); *B60R 2021/23509* (2013.01)

(58) Field of Classification Search
CPC .............. B60R 21/2338; B60R 21/235; B60R 2021/0009; B60R 2021/23308; B60R 2021/23386; B60R 2021/23509
See application file for complete search history.

(56) References Cited

U.S. PATENT DOCUMENTS

| | | | |
|---|---|---|---|
| 8,727,375 B2 * | 5/2014 | Suzuki | B60R 21/233 280/730.2 |
| 8,740,247 B1 * | 6/2014 | Jovicevic | B60R 21/232 280/730.2 |
| 9,227,590 B2 * | 1/2016 | Fujiwara | B60R 21/23138 |
| 9,296,359 B2 * | 3/2016 | Pan | B60R 21/233 |
| 9,487,179 B2 * | 11/2016 | Takedomi | B60R 21/2334 |
| 2005/0206138 A1 * | 9/2005 | Breuninger | B60R 21/231 280/729 |
| 2012/0193897 A1 | 8/2012 | Ruedisueli et al. | |

\* cited by examiner

HEAD AIRBAG SYSTEM FOR A VEHICLE AND VEHICLE WITH A HEAD AIRBAG SYSTEM

CROSS REFERENCE TO RELATED APPLICATIONS

This application is a National Stage of International Application No. PCT/EP2015/060055 filed May 7, 2015, claiming priority based on European Patent Application No. 14 167 500.9, filed May 8, 2014, the contents of all of which are incorporated herein by reference in their entirety.

DESCRIPTION

The invention relates to a head airbag system for a vehicle and to a vehicle with a head airbag system of the type specified in the preambles of the independent claims.

Usual head airbag systems usually have two fabric layers connected to each other, for example sewed or woven to each other, which form a gas bag capable of being filled with gas. Such gas bags can have one or more chambers, which are filled with gas upon side impact of a vehicle, whereby a restraining effect with respect to the occupants in vehicle transverse direction and in particular protection of a head area of the vehicle occupants is achieved.

In oblique frontal load cases, thus if a vehicle is involved in such an accident that the forces acting on the vehicle have a component both in vehicle longitudinal direction and in vehicle transverse direction, situations can occur, in which sufficient vehicle occupant protection cannot be achieved. On the one hand, a so-called dive-through can occur, in which vehicle occupants sitting in a second seat row of a vehicle are first accelerated obliquely forwards and then are again accelerated obliquely rearwards due to the oblique frontal load case. Therein, it can occur that the vehicle occupants get between the gas bag deployed into a restraining position and a vehicle pane or a door trim, which can entail injuries of the vehicle occupant. Furthermore, it can happen that a driver of a vehicle is also accelerated obliquely forwards with his head and torso upon an oblique frontal load case, wherein he dives through between a deployed driver airbag and a deployed gas bag of such a head airbag system and impinges on the dashboard with his head.

DE 10 2009 005 900 A1 shows a head airbag system. The head airbag system includes a gas bag and a catch strap, which is stretched between two vehicle-fixed points in the filled state of the gas bag, whereby a displacement of the gas bag in vehicle transverse direction is prevented.

EP 1 291 248 A2 shows a head airbag system with a first and a second fabric layer, which forms a gas bag. The gas bag is enclosed by two further fabric layers. They serve for covering respective constrictions of the gas bag, by which individual chambers of the deployed and inflated gas bag are separated from each other.

It is the object of the present invention to provide a head airbag system for a vehicle as well as a vehicle with a head airbag system, by means of which improved occupant protection, in particular in oblique frontal load cases, can be achieved.

This object is solved by a head airbag system as well as by a vehicle with a head airbag system having the features of the independent claims. Advantageous configurations with convenient and non-trivial developments of the invention are specified in the dependent claims.

The head airbag system according to the invention for a vehicle includes a gas bag unfoldable from a stowed position to a restraining position, which has two facing end sections, which are connected to each other by means of a connecting element fastened thereto. Therein, the head airbag system according to the invention is characterized in that the end sections are arranged opposite to each other with respect to a main deployment direction of the gas bag, wherein the connecting element is formed and fastened to the end sections such that the distance between the end sections with respect to the vertical direction of the deployed gas bag is less than the length of a gas bag area extending between the end sections in a deployed restraining position of the gas bag.

Thus, the connecting element is a shortening element, which restricts the deployment of the gas bag with respect to its main deployment direction, thus upon employment in an automobile in vehicle vertical direction. Therein, that direction is to be understood by main deployment direction, into which the gas bag most severely expands. In head air bag systems, the gas bag is usually formed as a type of curtain, which deploys from its stowed position in a headliner area of the automobile substantially in vehicle vertical direction downwards into the vehicle interior into a restraining position as soon as the gas bag is filled with a gas.

Due to the configuration and arrangement of the connecting element at the gas bag according to the invention, it curves into the restraining position, thus in vehicle transverse direction upon its deployment. Besides the curvature of the gas bag, which results from filling the gas bag with the gas, the central part of the gas bag viewed in vehicle vertical direction arcuately bends in the direction of the vehicle interior.

The gas bag first deploys in its main deployment direction until the connecting element fastened to the gas bag is completely unfolded and thus stretched. As soon as the connecting element is unfolded, it limits the further deployment of the gas bag in vehicle vertical direction—thus in the main deployment direction of the gas bag—and the gas bag curves in the direction of the vehicle interior in further filling thereof.

In the head airbag system according to the invention, the gas bag further curves into the vehicle interior than a gas bag with the same geometry without the connecting element would curve into the vehicle interior. Thus, with decreased volume of the chamber or the chambers of the gas bag, the same curvature into a vehicle interior as with a gas bag without the connecting element and with larger chamber volume can be achieved.

A kind of bracing effect is achieved by the connecting element. Due to the curvature of the central part of the gas bag into the vehicle interior, the lower end section viewed in vehicle vertical direction is braced opposite to the curvature direction of the central part of the gas bag. In other words, the gas bag is forced into an arcuate shape in its deployment into the restraining position by the connecting element—most severely in the area, in which the connecting element is attached to the gas bag.

By the curvature of the gas bag deployed into the restraining position, the distance between the deployed gas bag and a head or also torso of a vehicle occupant in vehicle transverse direction is reduced, thus, also the acceleration path in the direction of the deployed gas bag, and as a result the speed of impact of the vehicle occupant on the gas bag is decreased. Corresponding forces acting on the vehicle occupant resulting from impact on the gas bag are thereby reduced.

In advantageous configuration of the invention, it is provided that the connecting element is arranged on that side of the gas bag, which faces away from a passenger cabin of the vehicle in the deployed restraining position with intended arrangement of the head airbag system in a vehicle. Thereby, it is ensured that the gas bag curves into the vehicle interior in the deployed restraining position.

In further advantageous configuration of the invention, it is provided that the connecting element is dimensioned and arranged at the gas bag such that the gas bag is abutted on a door interior trim of a rear vehicle door of the vehicle in the deployed restraining position with intended arrangement of the head airbag system in a vehicle. The connecting element and the gas bag are therefore dimensioned such that the gas bag curves into the vehicle interior such that the gas bag abuts on a door interior trim of a rear vehicle door of the vehicle with its lower end section viewed in vehicle vertical direction. Thereby, the initially described dive-through of a vehicle occupant sitting in the second seat row can be avoided in an oblique frontal load case. Namely, the gas bag is stretched upon its deployment by the connecting element such that it abuts on the door interior trim of a concerned rear vehicle door of the vehicle, whereby a vehicle occupant sitting in the second seat row cannot get between deployed gas bag and vehicle door in rebounding in an oblique frontal load case.

According to a further advantageous embodiment of the invention, it is provided that the connecting element is dimensioned and fastened to the gas bag such that the distance between the end sections of the gas bag deployed into the restraining position with respect to the vertical direction thereof decreases between a first and a second predetermined gas bag section in longitudinal direction of the gas bag. In other words, the connecting element is dimensioned and fastened to the gas bag such that the gas bag the more curves into the vehicle interior in the deployed restraining position with respect to a vehicle longitudinal direction the lower the distance between the end sections of the gas bag deployed into the restraining position is with respect to the vehicle vertical direction. In particular, the initially described case, in which a driver of an automobile misses the driver airbag and impinges on a dashboard in an oblique frontal load case, can thereby be avoided. The connecting element and the gas bag can be dimensioned and fastened to each other such that the gas bag deployed into the restraining position curves into the vehicle interior such that a gap is no longer present between deployed driver airbag and deployed gas bag of the head airbag system, through which the driver of the automobile can dive with his head. Analogously, this would apply in an arrangement of the gas bag in the passenger area.

In further advantageous configuration of the invention, it is provided that the connecting element is formed of the same material as the gas bag. Usually, gas bags of head airbag systems are sewed to each other from multiple fabric layers such that the connecting element, if it is formed of the same material as the gas bag, can be particularly simply sewed to the remaining gas bag. Moreover, in that the connecting element is formed of the same material as the gas bag, it is ensured that the connecting element has sufficient strength to ensure the previously described curvature of the gas bag into the vehicle interior without the connecting element tearing upon the relatively great loads during the deployment operation. Alternatively, the connecting element can also be formed of a material different from the gas bag as long as the connecting element is formed such that it withstands the loads during the deployment operation of the gas bag to ensure the initially described bracing effect or curvature of the gas bag into the vehicle interior.

A further advantageous embodiment of the invention provides that the connecting element is formed as a ribbon-shaped strip. According to geometry of the vehicle or the vehicle interior and the geometric ratios between connecting element and gas bag, the connecting element can therein extend vertically, horizontally or also diagonally viewed in vehicle vertical direction. Moreover, multiple connecting elements can also be provided at different locations of the gas bag to respectively locally allow curvature of the gas bag into the vehicle interior area at these locations.

According to a further advantageous embodiment of the invention, it is provided that the connecting element is formed in the form of a full-area bracing connecting the end sections. For example, the connecting element can be dimensioned and formed such that it completely covers a side pane or multiple side panes of a vehicle in the deployed state of the gas bag. The restraining effect of a vehicle occupant is additionally assisted by the full-area configuration of the connecting element such that the gas bag itself can be correspondingly lower dimensioned with respect to its gas volume. Thereby, inflators correspondingly required for filling the gas bag with gas can be smaller dimensioned such that the entire head airbag system as such can be more compactly configured and simpler stowed in the vehicle interior, usually in the area of the headliner of a vehicle. For example, the gas bag can also have multiple chambers capable of being filled with a gas, wherein the head airbag system includes a control device, which is adapted to fill at least one of the chambers of the gas bag with the gas in delayed manner. It can be provided that the gas bag has some main chambers, which preliminarily serve for protecting the heads of vehicle occupants. Furthermore, it can be provided that the gas bag has some auxiliary chambers, which are provided for a so-called rollover protection. This means that these auxiliary chambers are in particular to ensure that upon rollover of the vehicle, non-fastened persons are retained in it by these auxiliary chambers covering concerned window areas. Therein, the control device can be adapted such that the auxiliary chambers are filled with gas in delayed or also less severe manner. The consequence is that corresponding inflators for filling the gas bag can be smaller dimensioned. In context with the full-area formation of the connecting element, both the main chambers and the auxiliary chambers can be smaller dimensioned, whereby a corresponding inflator can be particularly compactly dimensioned. Moreover, by such a full-area bracing in a relatively wide area of the gas bag—thus in vehicle longitudinal direction—the said curvature into the vehicle interior is achieved.

In further advantageous configuration of the invention, it is provided that the connecting element has the same length as the gas bag related to the longitudinal direction of the gas bag. In other words, the connecting element is dimensioned such that with deployed gas bag it extends in vehicle longitudinal direction as far as the gas bag itself. Thereby, the support of the restraining effect of the head airbag system by the connecting element is again improved such that corresponding inflators can optionally be even smaller dimensioned. Moreover, in that the connecting element has the same length as the gas bag related to the longitudinal direction of the gas bag, in the deployed state of the gas bag, a vehicle occupant is prevented from being carried out of a vehicle window of the vehicle by the connecting element for example in a rollover even if he should not be fastened.

In further advantageous configuration of the invention, it is provided that the connecting element is flush with the respective end sections of the gas bag. In other words, the connecting element is fastened to the gas bag such that parts of the connecting element do not protrude beyond the end sections of the gas bag. Thereby, particularly little material has to be expended for the connecting element on the one hand, and the pack size of the gas bag together with the connecting element can be kept correspondingly small thereby on the other hand such that the installation space demand for the head airbag system overall can be kept particularly low.

A further advantageous embodiment of the invention provides that the gas bag is formed of two fabric layers. Preferably, the two fabric layers are sewed to the gas bag. The gas bag can be produced in particularly simple manner with two fabric layers.

The vehicle according to the invention includes the head airbag system according to the invention or an advantageous embodiment of the head airbag system according to the invention.

In advantageous configuration of the vehicle according to the invention, it is provided that the vehicle is an automobile.

A further advantageous embodiment of the vehicle according to the invention provides that the connecting element is dimensioned and fastened to a gas bag such that the distance between the end sections of the gas bag deployed into the restraining position with respect to the vertical direction thereof decreases from a B pillar of the vehicle up to the mirror triangle of the vehicle. In other words, the length of the connecting element in vehicle vertical direction decreases from the B pillar to the mirror triangle such that the gas bag increasingly curves into the vehicle interior from the B pillar to the mirror triangle in the deployed state.

Preferably, the connecting element is dimensioned and arranged at a gas bag such that the gas bag is curved into the vehicle interior of the vehicle in vehicle transverse direction in the deployed restraining position in the area of a mirror triangle of the vehicle as far as the gas bag contacts a gas bag of a driver or passenger airbag of the vehicle also deployed into a restraining position. Thereby, it can be ensured that a driver or a passenger no longer dives through between the deployed gas bag of the head airbag and a driver and passenger airbag, respectively, in an oblique frontal load case.

Further advantages, features and details of the invention are apparent from the following description of preferred embodiments as well as based on the drawing. The features and feature combinations mentioned above in the description as well as the features and feature combinations mentioned below in the description of figures and/or shown in the figures alone are usable not only in the respectively specified combination, but also in other combinations or alone without departing from the scope of the invention.

Figure 2:
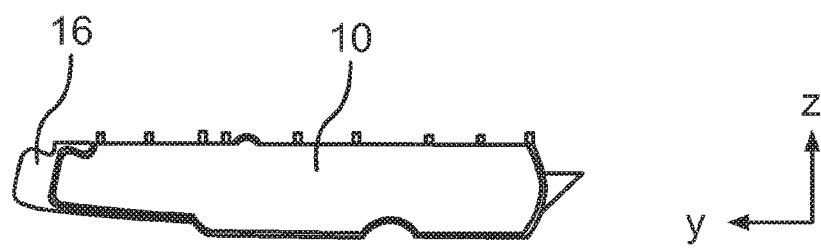
Figure 3:
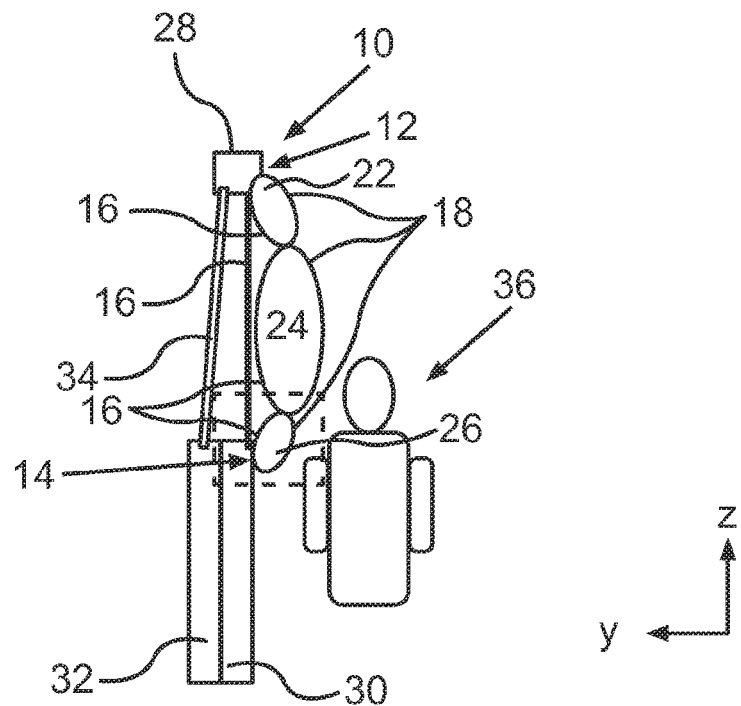
Figure 4:
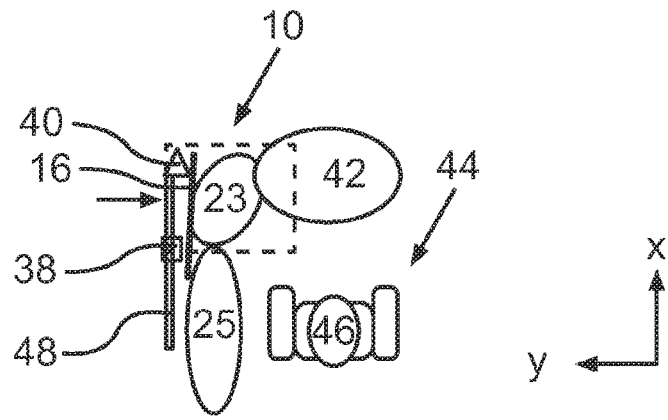
Figure 5:
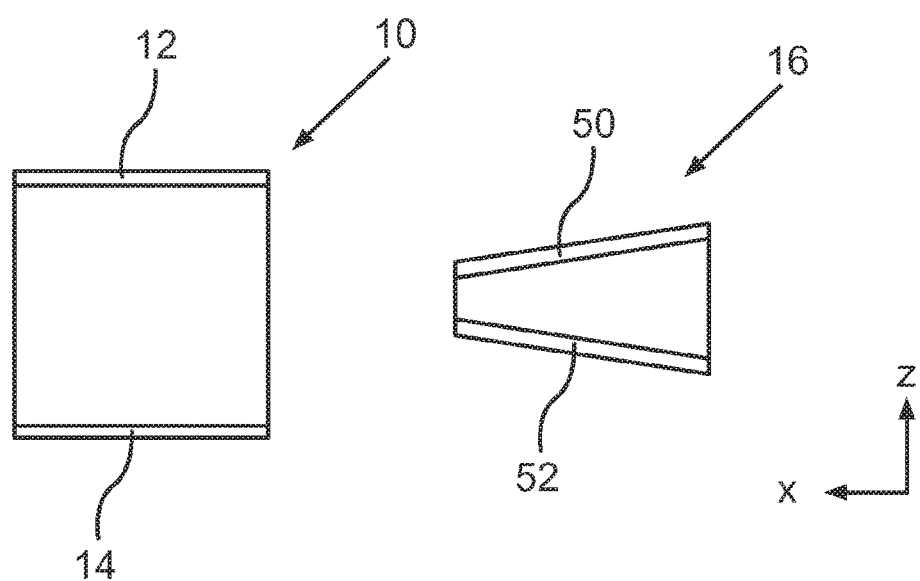

Below, embodiments of the invention are explained in more detail based on schematic drawings. There show:

FIG. 1 a schematic representation of a gas bag of a head airbag system having multiple chambers, deployed into a restraining position, at the upper and lower end section of which a connecting element is arranged, whereby the gas bag arcuately curves in vehicle transverse direction;

FIG. 2 a schematic representation of the gas bag and the connecting element in the folded state;

FIG. 3 a view of a vehicle interior of a motor vehicle, wherein a vehicle occupant sitting in the second seat row is schematically represented and the gas bag of the head airbag system is deployed into its restraining position;

FIG. 4 a plan view of a driver of an automobile, wherein the gas bag of the head airbag system as well as a driver airbag are deployed; and FIG. 5 a schematic representation of the gas bag and the connecting element, which are each separately illustrated.

In the figures, identical or functionally identical elements are provided with identical reference characters.

A gas bag 10 deployed into a restraining position of a head airbag system not indicated in more detail for a vehicle is shown in FIG. 1. Presently, the gas bag is represented in a plan view to the plane spanned by the vehicle vertical direction z and the vehicle transverse direction y. Therein, the vehicle vertical direction z substantially represents the main deployment direction of the gas bag 10. The gas bag 10 has two facing end sections 12, 14, which are connected to each other by means of a connecting element 16 fastened to them.

The gas bag 10 is formed of two fabric layers 18, 20, which are sewed to each other such that three separate chambers 22, 24, 26 are formed, which are presently filled with a gas.

The connecting element 16 is formed and fastened to the end sections 12, 14 such that the distance between the end sections 12, 14 related to the vertical direction of the deployed gas bag, thus the vehicle vertical direction z in the present representation, is lower than the length of a gas bag area extending between the end sections in the deployed restraining position of the gas bag 10 shown here. In other words, the connecting element 16 is formed shorter in vehicle vertical direction z than the gas bag 10 if the connecting element 16 would not be disposed on it and the gas bag 10 would substantially hang downwards in vehicle vertical direction z.

Upon deployment of the gas bag 10 into the restraining position shown here, the connecting element 16 is stretched, whereby the gas bag 10 only deploys in shortened form in the vehicle vertical direction Z and curves in the direction of a vehicle interior not shown here in vehicle vertical direction Y at the latest when the connecting element 16 is completely stretched.

In FIG. 2, the gas bag 10 and the connecting element 16 are illustrated in their folded stowed position. In the present representation, the gas bag 10 arranged in the stowed position and the connecting element also arranged in the stowed position are shown in the plane spanned in the vehicle transverse direction y from the vehicle vertical direction z similarly as in FIG. 1. Presently, the connecting element 16 is produced from the same material as the two fabric layers 18, 20 of the gas bag 10. However, the connecting element 16 can also be produced of other materials. Therein, it is essential that the connecting element 16 withstands the loads upon deploying the gas bag 10 and does not tear.

In FIG. 3, the gas bag 10 deployed into the restraining position is illustrated, wherein it is presently illustrated in the area of a second seat row of the vehicle interior area of an automobile. The gas bag 10 has deployed together with the connecting element 16 from a headliner area of the automobile not designated in more detail here from a container 28 from a stowed position into the restraining position shown here. By the curvature of the gas bag 10 caused due to the connecting element 16, the lower end section 14 is abutted on a door trim 30 of a vehicle door 32. Moreover, the connecting element 16 is formed as a type of full-area bracing, which completely covers a window 34.

Due to the connecting element 16 serving as a shortening element, the gas bag 10 is thus braced in the direction of the door interior trim 30 such that the vehicle occupant 36 shown here cannot get between the deployed gas bag 10 and the pane 34 or the door interior trim 30 even upon an accident with an oblique frontal load case, thus deceleration of the automobile—thus also of the vehicle occupant 36—in vehicle longitudinal direction x and vehicle transverse direction y.

In FIG. 4, a vehicle interior of an automobile is shown in the area of a vehicle seat in a plan view. The gas bag 10 is again shown in its deployed restraining position, wherein the connecting element 16 is dimensioned and fastened to the gas bag 10 such that the distance in vehicle vertical direction z between the end sections 12, 14 not designated here of the gas bag 10 deployed into the restraining position with respect to the vertical direction thereof, thus in vehicle vertical direction z, decreases from a B pillar 38 here schematically indicated to a mirror triangle 40 of the automobile also only schematically indicated. In other words, the length of the connecting element 16 decreases in vehicle vertical direction z from the B pillar 38 to the mirror triangle 40.

Furthermore, the connecting element 16 is dimensioned and arranged at the gas bag 10 such that the gas bag 10 is curved into the vehicle interior of the vehicle in the area of the mirror triangle 40 of the automobile in vehicle transverse direction y in the restraining position shown here as far as the gas bag 10 contacts a gas bag 42 of a driver airbag also deployed into a restraining position.

Thus, if an accident with an oblique frontal load case should occur, in which the driver 44 is forwards accelerated both in vehicle transverse direction y and in vehicle longitudinal direction x, thus obliquely frontward to the left according to FIG. 4, the gas bag 10 inwards curved in vehicle transverse direction y prevents the driver 44 from being able to get between the gas bag 42 of the driver airbag and the gas bag 10 of the head airbag system with his head 46. Presently, the connecting element 16 is only arranged in the area between the B pillar 38 and the mirror triangle 40. However, it is alternatively also possible that the connecting element 16 completely extends along a front pane 48 in vehicle longitudinal direction x. Thereby, an additional restraining effect is achieved by the connecting element 16, wherein by a full-area bracing of the pane 48 by means of the connecting element 16, the driver 44 is additionally prevented from being carried out of the window 48 upon rollover of the automobile, if he should not be fastened.

In FIG. 5, the gas bag 10 and the connecting element 16 are again schematically illustrated, wherein they are presently shown in the plane spanned from the vehicle vertical direction z and the vehicle longitudinal direction x. For example, the connecting element 16 can be fastened to the end sections 12, 14 of the gas bag 10 in flush manner with corresponding end sections 50, 52. For example, it is possible that the connecting element 16 is sewed or also adhered to the gas bag 10.

As is apparent, the connecting element 16 increasingly tapers along the vehicle longitudinal direction x in the present representation. In the state connected to each other, the connecting element 16 thus causes the gas bag 10 to be increasingly prevented from extending downwards in deploying in the vehicle vertical direction x along the longitudinal direction x of the vehicle. The local curvature of the gas bag 10 in the direction of the vehicle interior thus becomes the more severe the greater the respectively local length difference between the connecting element 16 and the gas bag 10 is in vehicle vertical direction z.

Besides the continuous configuration of the connecting element 16 shown in FIG. 5, instead, multiple ribbon-shaped connecting elements 16 can also be attached to different locations of the gas bag 10, according to at which locations of the automobile a curvature of the gas bag 10 into the vehicle interior is desired.

Furthermore, the connecting elements 16 can be formed correspondingly shorter or longer in proportion to the extension of the gas bag 10 in vehicle vertical direction z according to desired extent of the curvature of the gas bag 10.

The invention claimed is:

1. Head airbag system for a vehicle including a gas bag (10) unfoldable from a stowed position into a restraining position, which has two facing end sections (12, 14), which are connected to each other by means of a connecting element (16) fastened to them, wherein
the end sections (12, 14) are arranged opposite with respect to a main deployment direction (z) of the gas bag (10);
the connecting element (16) is formed and fastened to the end sections (12, 14) such that the distance between the end sections (12, 14) with respect to the vertical direction (Z) of the deployed gas bag (10) is lower than the length of a gas bag area extending between the end sections in a deployed restraining position of the gas bag (10);
characterized in that
the connecting element (16) is dimensioned and fastened to the gas bag (10) such that the distance between the end sections (12, 14) of the gas bag (10) deployed into the restraining position with respect to the vertical direction (Z) thereof decreases between a first and a second predetermined gas bag section in longitudinal direction (X) of the gas bag (10), wherein the connecting element (16) increasingly tapers along the vehicle longitudinal direction (x).

2. Head airbag system according to claim 1,
characterized in that
the connecting element (16) is arranged on that side of the gas bag (10), which faces away from a passenger cabin of the vehicle in the deployed restraining position with intended arrangement of the head airbag system in a vehicle.

3. Head airbag system according to claim 1,
characterized in that
the connecting element (16) is dimensioned and arranged at the gas bag (10) such that the gas bag (10) is abutted on a door interior trim (30) of a rear vehicle door (32) of the vehicle in the deployed restraining position with intended arrangement of the head airbag system in a vehicle.

4. Head airbag system according to claim 1,
characterized in that
the connecting element (16) is formed of the same material as the gas bag (10).

5. Head airbag system according to claim 1,
characterized in that
the connecting element (16) is formed as a ribbon-shaped strip.

6. Head airbag system according to claim 1,
characterized in that
the connecting element (16) is formed in the form of a full-area bracing connecting the end sections (12, 14).

7. Head airbag system according to claim 6,
characterized in that
the connecting element (16) has the same length as the gas bag (10) with respect to the longitudinal direction (X) of the gas bag (10).

8. Head airbag system according to claim 1,
characterized in that
the connecting element (16) is flush with the respective end sections (12, 14) of the gas bag (10).

9. Head airbag system according to claim 1,
characterized in that
the gas bag (10) is formed of two fabric layers (16, 18).

10. Vehicle with a head airbag system according to claim 1.

11. Vehicle according to claim 10,
characterized in that
the vehicle is an automobile.

12. Vehicle according to claim 11,
characterized in that
the connecting element (16) is dimensioned and fastened to the gas bag (10) such that the distance between the end sections (12, 14) of the gas bag deployed into the restraining position with respect to the vertical direction (Z) thereof decreases in a direction from a B pillar (38) of the vehicle to a front of the vehicle.

13. Vehicle according to claim 11,
characterized in that
the connecting element (16) is dimensioned and fastened to the gas bag (10) such that the gas bag (10) is curved into the vehicle interior of the vehicle in the deployed restraining position in an area of a forward part of a window of the vehicle in vehicle transverse direction (Y) as far as the gas bag (10) contacts a gas bag (42) of a driver or passenger airbag of the vehicle also deployed into a restraining position.

* * * * *